INVENTOR.
JOHN V. WERME
BY
John F. Luhrs
ATTORNEY

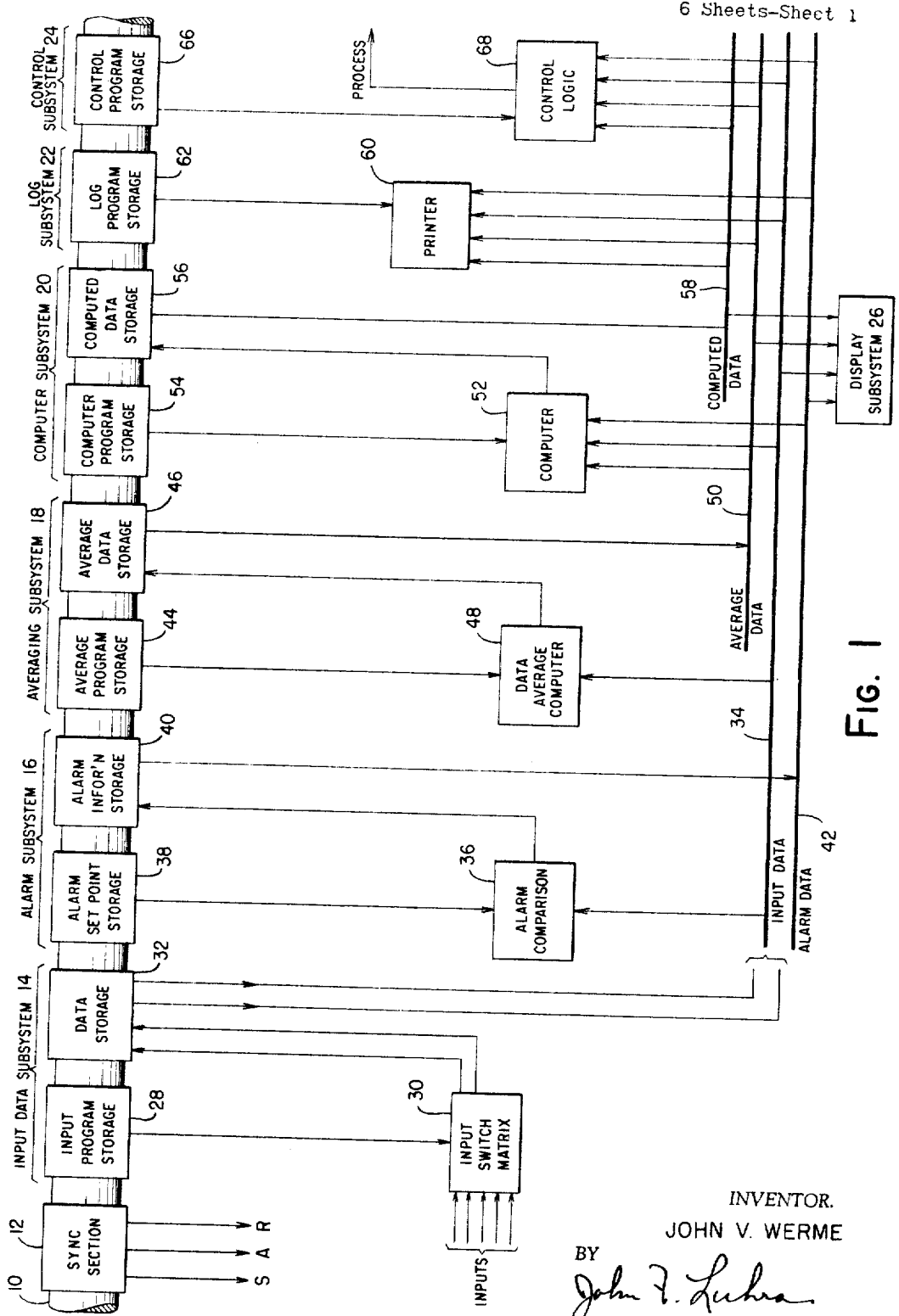

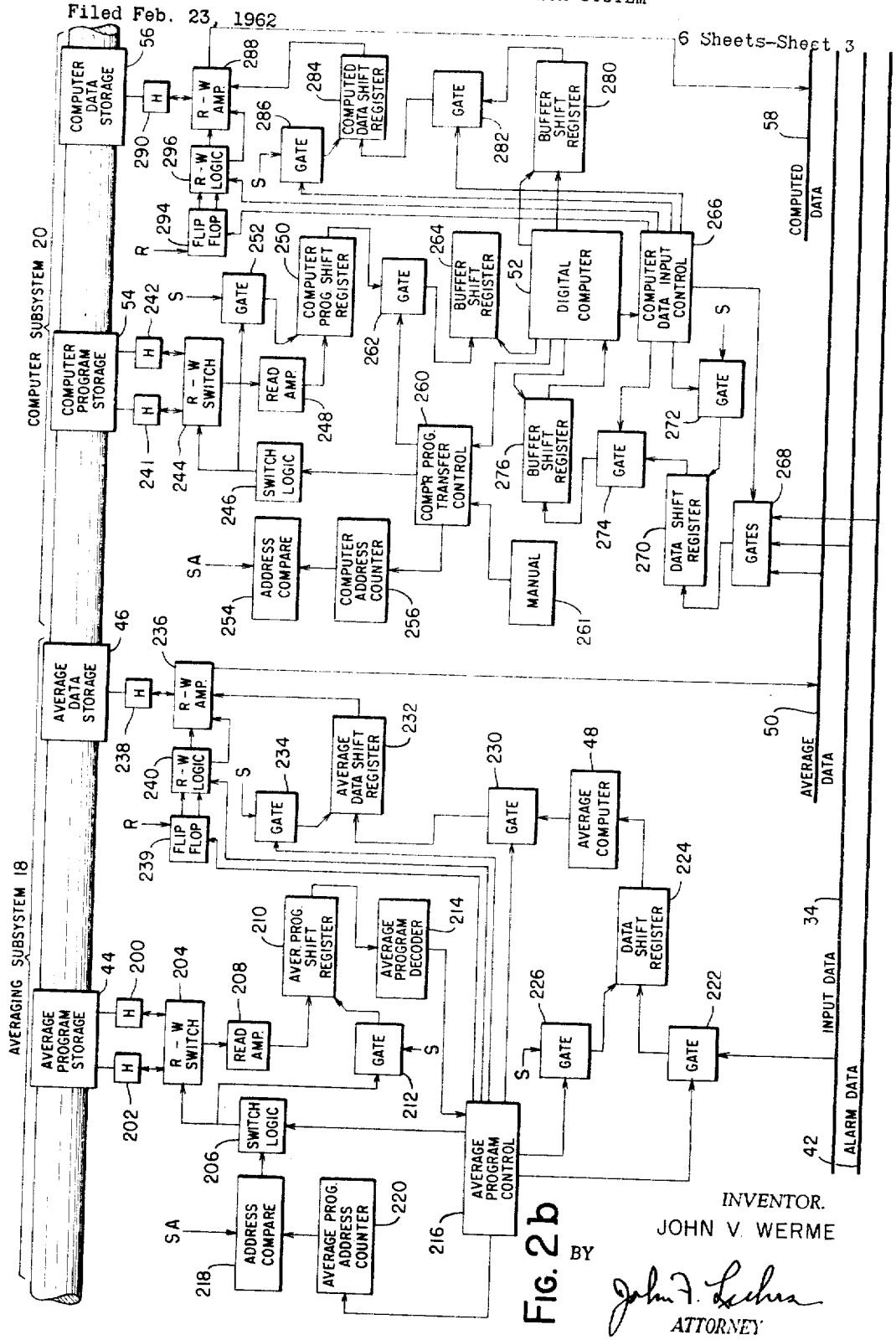

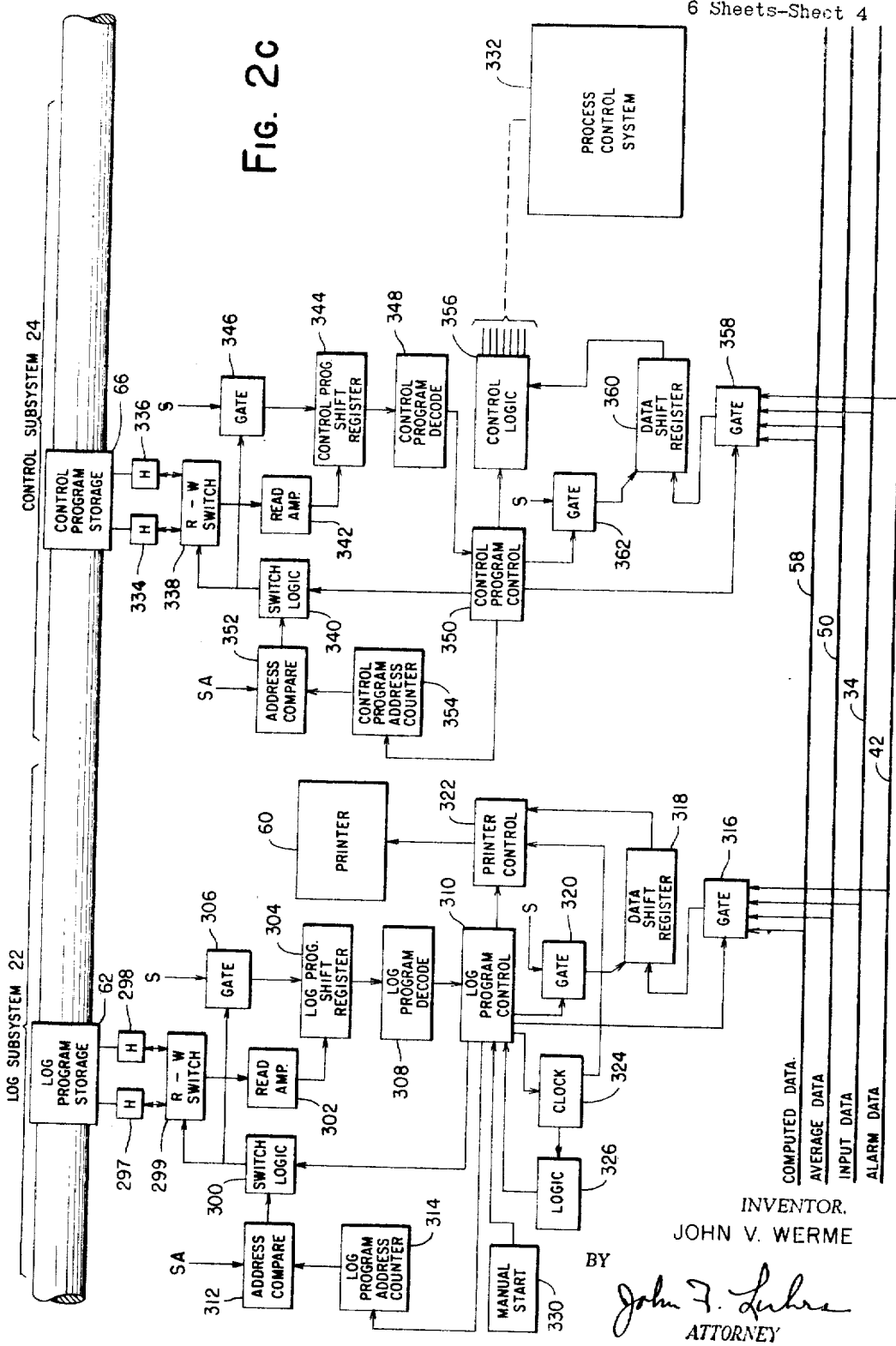

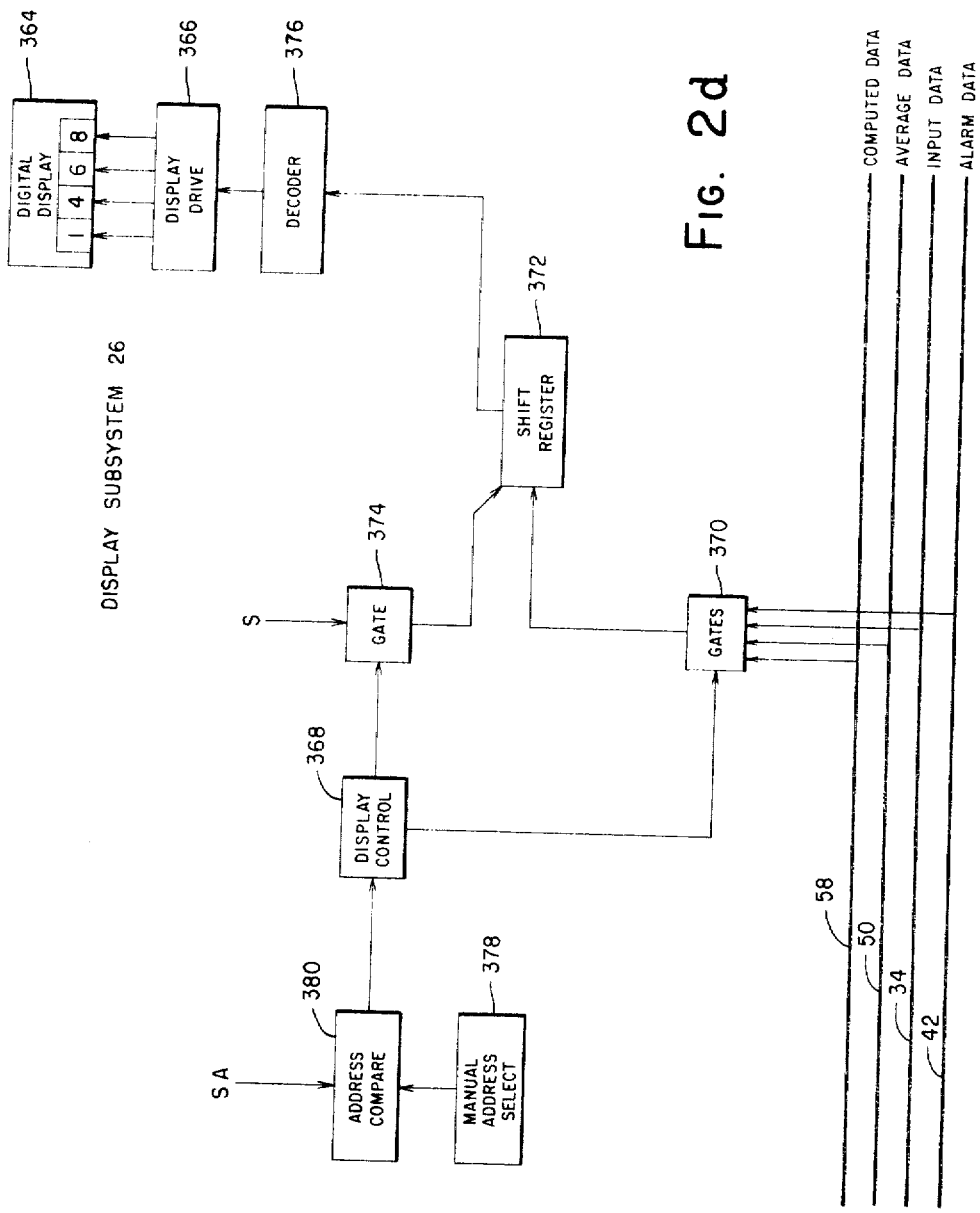

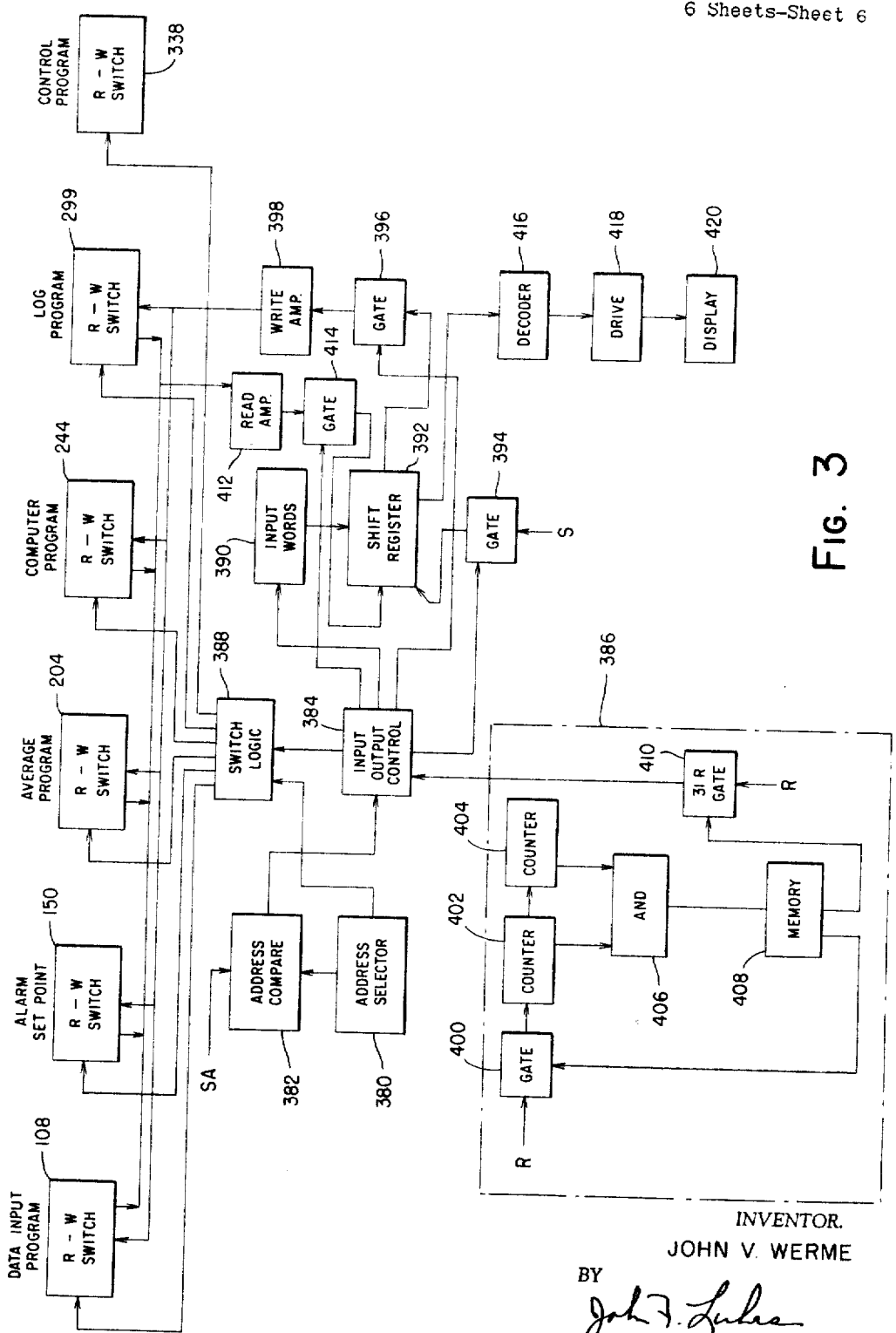

United States Patent Office 3,266,023
Patented August 9, 1966

3,266,023
PARALLEL PROGRAM DATA SYSTEM
John V. Werme, Painesville, Ohio, assignor to Bailey Meter Company, a corporation of Delaware
Filed Feb. 23, 1962, Ser. No. 175,014
11 Claims. (Cl. 340—172.5)

This invention relates to data handling and computing systems applicable to industrial processes and more particularly to an improved system utilizing a unique parallel program approach to system logic and control.

Modern industrial processes have become large and complex in nature and require a multitude of measurements for complete knowledge of process operation and to achieve optimum control accuracy. For example, in a modern electric utility generating unit a computer control system may have over a thousand information inputs. This vast quantity of information to be analyzed and/or computed or merely displayed has resulted in the use of complex digital computing and data handling systems for collecting, storing and computing the data.

The typical data handling and computing system performs a number of specific functions. For example, the system may scan process variables and store information relating to the condition thereof, perform mathematical computations, make set point comparisons, perform alarm functions, log and display desired information, and logically control the process variables.

The approach generally utilized to achieve the above functions involves the use of a high speed single channel general purpose digital computer having data input and output circuits, data processing circuitry and memory sections for data storage and storage of programs for each of the specific functions. With this approach the general purpose digital computer is the "brain" of the system and controls all of the specific functions. Such a system while capable of accurately monitoring and controlling a process is subject to several limitations which have created hesitancy on the part of many industries to utilize the system.

One major objection to the general purpose computer in a data handling and control system is the basic complexity of the system. This in general arises from the fact that the various programs must share the computer processing circuitry, stored data access circuitry and the input and output circuitry. For example, the "store command" cannot be used simultaneously by each program but must be used sequentially. Similarly access to stored data is through a single channel which must be used alternately by the various program sections. Each of the programs must satisfy its particular operating function on a definite time schedule. However, when the computer functions to control or operate the process or plant a corrective action may be required immediately taking precedence over all other specific functions of the computer. In this case the less essential specific functions of the system such as logging, display, etc., must be performed in between the time periods when the computer is required to operate the plant. To render the computer compatible to this mode of operation a complex network of programming circuitry and an ingenious interlocking of commands is required.

The direct result of complexity in the case of the general purpose computer is the servicing and programming difficulty. In the case of an electric utility plant the operators are power engineers and not computer experts. Yet with the complexity of the general purpose computer as discussed above a computer expert having extensive practical training is required to service the computer or modify its program. While this limitation is objectionable from a cost standpoint it is even more objectionable from a flexibility standpoint—for example, during emergency conditions the operator may desire to modify the operation of the plant by changing the computer program. If a power engineer cannot immediately accomplish this modification without the assistance of a computer expert the value of the equipment can be questioned.

Another major limitation of the general purpose computer system is the reliability problem. In many instances a circuit failure in the computer will result in complete inoperativeness or shut-down of the entire system due to the many common circuits utilized sequentially by the different program sections. Thus, while basically the general purpose computer possesses good realiability, there are many component failures which can result in complete inoperativeness of the system and which due to the complexity of the circuitry involved, results in a costly and time-consuming servicing problem.

It is a principal object of my invention to provide a data handling and computing system which is not subject to the above mentioned limitations of the general purpose computer system.

Another object of the invention is to utilize in a data handling system a plurality of independently programmed and functionally independent subsystems having independent access to common data storage sections.

Another object of the invention is to provide a data handling and computing system which can be programmed or serviced by semi-skilled personnel.

In one embodiment of the invention a magnetic drum memory is provided with an input data storage section and a plurality of memory sections for storing independently the programs for each of the specific system functions and the collected and computed data. Each program is associated with a subsystem comprising an independent group of operational components which perform only the program function and which is operative independently of the other program functions. One memory section contains the computational program for a digital computer and forms an independent subsystem with the computer to render the computer operation independent of other specific system functions. The subsystems are effectively operative independently and simultaneously in parallel from separate isolated programs. The only portion of the system common to said parallel subsystems are the data storage sections which are uniquely arranged to enable the subsystems to extract data simultaneously therefrom.

Other objects and advantages will become apparent from the following description taken in connection with accompanying drawings wherein:

FIG. 1 is a schematic illustration in functional block diagram of the basic operation of the disclosed embodiment of the invention;

FIGS. 2a, 2b, 2c and 2d are sections of a complete schematic illustration in functional block diagram showing in more detail the operational components of the disclosed embodiment; and FIG. 3 is a schematic illustration in functional block diagram of the memory input circuitry for the system illustrated in FIG. 2.

GENERAL DESCRIPTION

Figure 2A:
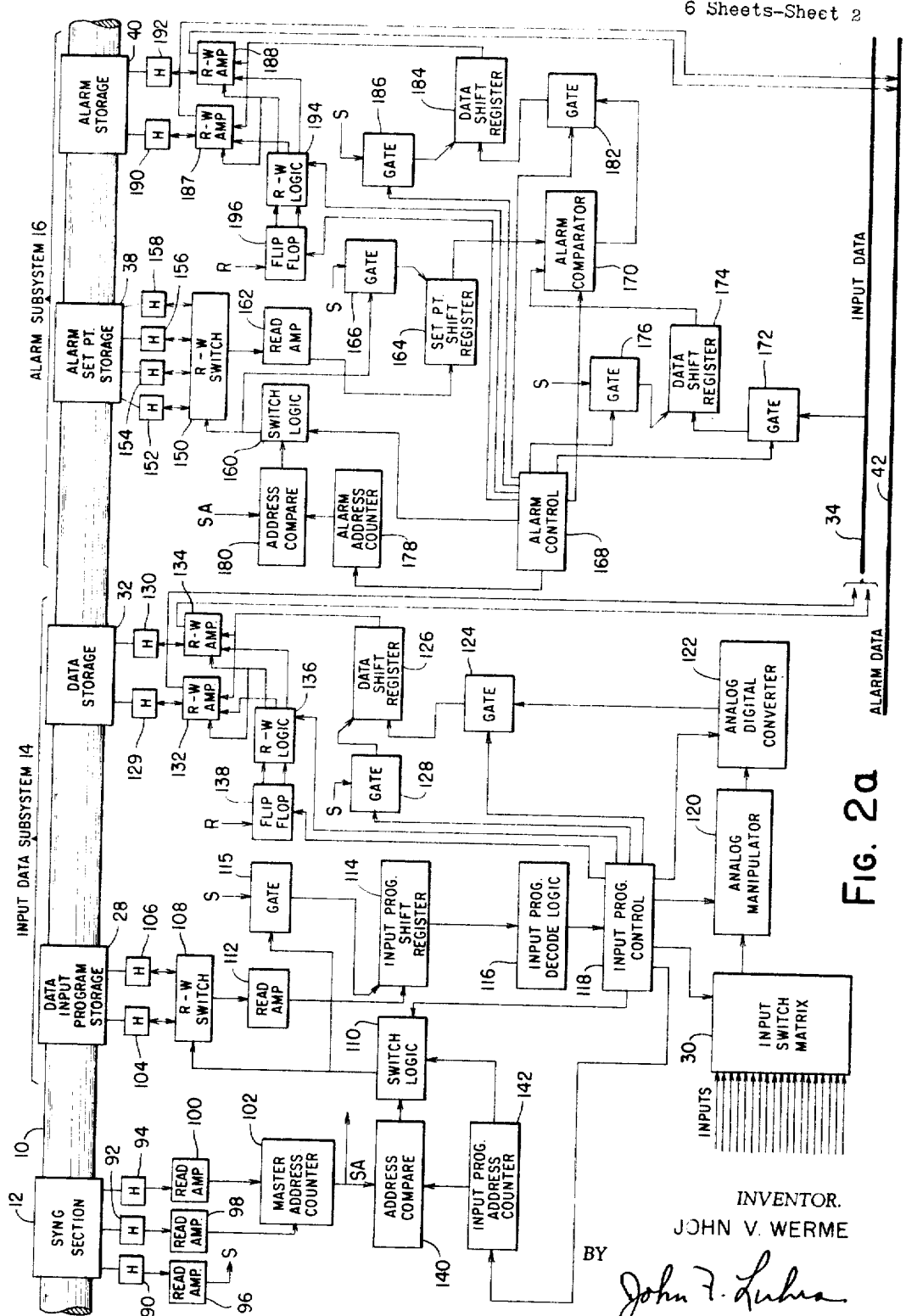

Referring to FIG. 1 of the drawings there is shown schematically a magnetic drum memory 10 which is adapted to be rotated at a constant speed by an electric motor (not shown). As is well known to those skilled in the art information is stored on the pheriphery of the drum in the form of small magnetized areas each of which forms a binary bit, magnetization of one polarity representing a binary zero and magnetization of the other polarity representing a binary one. This binary bit information is stored around the circumference of the drum in data tracks and a series of bits form a binary word. The number of bits and words vary with the physical size of the drum and other factors. One suitable arrangement on which the description will be based provides for recording 2,000 bits in each track, these being divided into 100 storage blocks containing as many as 20 binary bits. Each storage block manifests a word in binary coded form either in the nature of an instruction or a number and may contain bit information representative of algebraic signs.

The drum 10 is provided with a Sync Section 12 which is provided with at least 3 pulse tracks providing three sets of pulses occurring at various intervals during a revolution of the drum 10. From one track 2,000 bit pulses are derived during each drum revolution from a continuous channel of recorded binary ones. These bit pulses correspond to the location of binary bits in the data storage tracks and are denoted in FIG. 1 by the letter S. A second track of the Sync Section 12 contains 100 bit pulses identified by the letter A corresponding in number and location to the binary words in the data storage tracks to thus provide an index to word location. A third track contains one bit pulse which produces a single output pulse R during each drum revolution to establish a drum zero or arbitrary zero position index. The S, A and R pulses are utilized to establish a word address to enable information to be read out of or written into the information storage tracks at a particular location. This basic synchronism is well known to those skilled in the art and further description is deemed unnecessary.

The system illustrated functionally in FIG. 1 comprises a plurality of functionally independent parallel subsystems 14, 16, 18, 20, 22, 24, and 26 each of which performs its indicated subsystem functions independently of the other subsystems. While the invention is not limited to any particular combination of subsystem functions there is disclosed for purposes of description a digital system having an Input Data Subsystem 14 for collecting and storing data an Alarm Subsystem 16 for comparing the input data with preselected setpoints, an Averaging Subsystem 18 for averaging input data, a Computer Subsystem 20 for performing desired mathematical calculations, a Log Subsystem 22 for logging out desired data, a Control Subsystem 24 for operating and controlling a process such as an electric utility plant, and a Display Subsystem 26 for providing a digital display of desired data.

The Input Data Subsystem 14 functions to continuously scan a plurality of inputs which may be representative of the instantaneous condition of process variables and in the case of an electric utility plant may be representative of variables such as temperature, pressure, flow rate, generator output, et cetera. The Subsystem 14 is provided with in general a magnetic drum memory section 28 which stores the data collection program for controlling the selective input switching of a plurality of inputs in an input switch matrix 30. The scanned input data is stored in storage tracks of a data storage section 32 of the drum 10. The number of storage tracks in section 32 is dependent on the number of inputs. For purposes of illustration only I have diagrammatically indicated two data lines extending from the matrix 30 to memory section 32 to thereby indicate the provision in the disclosed embodiment for at least two data storage tracks.

As will be described more particularly with reference to FIG. 2 suitable logic circuitry is effective to control a read-write switch associated with data storage section 32 whereby input data is written on and read from the storage tracks only during preselected drum revolutions to render the stored data continuously available to the other subsystems. While the relative number of drum revolutions devoted to read and write operation may vary with the application of the system the logic circuitry disclosed functions to establish write operation during alternate revolutions and read operation during the other revolutions. To illustrate functionally the availability of stored data during a read revolution there is shown two output data lines extending from the memory section 32 to a data bus 34. Each of the other subsystems contains logic circuitry effective to gate desired data from this data bus 34 when the particular subsystem program function demands data from a desired storage location. Thus, the stored data is available simultaneously in parallel to all subsystems.

The Alarm Subsystem 16 as functionally illustrated in FIG. 1 comprises an alarm comparison system 36 which compares the input data during alternate drum revolutions with predetermined variable setpoints which may be stored in one or more tracks of a memory section 38. The comparison system may provide a high or low indication with respect to the setpoint or manifest a digital difference value depending on the requirements of a particular process. The desired alarm information obtained in system 36 is shown functionally as being transmitted by a data line to a memory section 40. Similar to Subsystem 14 data may be stored during alternate drum revolutions and continuously read out during the other revolutions into an alarm data bus 42 from which digital information is continuously available to the other subsystems.

The Averaging Subsystem 18 is shown as comprising an average program memory section 44 and an average data storage section 46. A data averaging system 48 functions in accordance with the subsystem program to average successive values of preselected inputs to produce a digital signal representative of the average. The average so obtained is written into one or more storage tracks of data storage section 46 during alternate drum revolutions and read out during the other revolutions into an average data bus 50 to make the average data readily available to other subsystems.

The Computer subsystem 20 comprises a digital computer 52 to which information may be gated from buses 34, 42, 50 for computation in accordance with a computer program stored in a memory section 54. Computed data is similarly written into one or more storage tracks of memory section 56 during alternate drum revolutions and continuously read out into computed data bus 58 during the other revolutions. The digital computer 52 thus performs only the function of data computation and is not utilized to coordinate the entire system.

The Log Subsystem 22 functions to log out selected information during alternate drum revolutions and is functionally illustrated in FIG. 1 as comprising a printer 60 to which data may be gated from buses 34, 42, 50, 58. The desired data is gated from the data buses in accordance with a log program stored in a memory section 62.

The Control Subsystem 24 is functionally illustrated as including a control program memory storage section 66 and a control logic unit 68 which gates selected data from the buses 34, 42, 50 and 58 and modifies the process operation or control accordingly. The control subsystem being functionally independent can operate continuously to modify the process operation without interfering with or delaying the other subsystem functions.

Display Subsystem 26 enables the operator to manually effect a visual display of any stored data practically instantaneously upon actuation of a suitable control switch. This Subsystem also functions by means of its own logic circuitry to gate selected data from data buses 34, 42, 50 and 58 independently of the other subsystems to render the display function independent of the other specific functions.

The basic system concept as functionally illustrated in FIG. 1 thus contemplates the provision of a plurality of parallel operating data subsystems each of which performs its designated function independently of the other subsystems. This non-interdependence concept coupled with the simultaneous availability of data to all subsystems renders the system extremely flexible and basically simple in nature. Programming simplification is achieved in that each subsystem need only be individually programmed to perform a single function without regard to operation of other specific system functions.

SYNC SECTION 12—FIG. 2a

Referring now to FIG. 2a of the drawings, which illustrate the functional components of the Sync Section 12, Input Data Subsystem 14, and Alarm Subsystem 16 there is shown three read heads 90, 92 and 94 associated with the Sync Section 12 to continuously read out the sync pulses from the three pulse storage tracks containing the S, A and R pulses. Read amplifiers 96, 98, and 100 accept the low level pulse signals from the heads 90, 92, and 94 respectively and amplify and shape them into the indicated output pulses S, A, and R for use throughout the system. A master address counter 102 receives the word pulses A as stepping pulses and the drum origin or R pulses as clearing pulses. With this arrangement the counter 102 is advanced once in response to each A pulse and cleared once every drum revolution in response to the R pulse to establish an output system address signal SA representative of the angular position of drum 10 and the particular word locations in the various memory storage tracks relative to the associated reading heads. This method of establishing a system address is well known to those skilled in the art and further description is deemed unnecessary.

INPUT DATA SUBSYSTEM 14—FIG. 2a

This subsystem functions to control the input scanning of a plurality of analog (or digital) inputs representative, for example, of process variables. The subsystem functions in accordance with a program stored in one or more storage tracks of memory section 28 which is illustrated as having a pair of read-write heads 104, 106 for reading information from or writing information into, in this case two data storage tracks. The read and write functions of heads 104 and 106 are controlled by a read-write switch 108 which normally receives read instructions from the subsystem switch logic circuitry functionally illustrated by block 110 but which at predetermined intervals is controlled by a program input and display circuit illustrated in FIG. 3. As will later be described, the memory input or display circuit illustrated in FIG. 3 is rendered operative only during certain drum revolutions to thus apportion the operating time between read operation under the control of logic circuit 110 and program entry and display under the control of the circuit of FIG. 3. While the time available for each of these functions will vary with requirements of the process one suitable schedule contemplates read operation of switch 108 under the control of logic circuit 110 for 30 continuous drum revolutions and then write operation under the control of the circuit of FIG. 3 during only the 31st revolution resulting in approximately 3% of the operating time being available for program entry and display.

During operation of switch 108 in response to a read command from switch logic unit 110 a binary word comprising a combination of pulses is read from one of the data storage tracks of memory section 28, amplified and shaped by a read amplifier 112 and received in an input program shift register 114 having a series input and a parallel output. During the transfer of a word from memory section 28, S pulses are gated through a gate 115 controlled by logic circuit 110 and applied to the shift circuit of register 114 to effect input shifting of the serial bit information into the shift register flip-flops.

The shift register 114 functions in a manner well known to those skilled in the art to store statically the instruction word thus transferred out of the memory section 28 until the next word is transferred upon completion of the operations required by the stored instruction. Within the register 114 the data transferred serially out of the memory section 28 is stored in parallel form in the proper shift register flip-flops.

Within the shift register 114 the instruction is thus stored as a combination of binary bits similar to those stored in the memory section 28. A decode logic unit 116 functions to convert these bit combinations into separate or discrete signals representing each instruction. To illustrate functionally the circuitry associated with decode logic unit 116 for carrying out the instructions I have shown schematically an input program control circuit 118 connected to the output of decode logic unit 116 by an appropriate data line.

In the application of the invention disclosed the primary function of the Input Data Subsystem 14 is to scan a plurality of analog inputs representative of process variables which in FIG. 2a are represented by a plurality of input data lines connected to input switch matrix 30. Normally a binary word transferred into register 114 from memory section 28 contains an instruction to scan a particular input. The decode logic unit 116 through input program control circuit 118 functions in response to the scan instruction to cause the selected input to be connected through switch matrix 30 to the input of an analog manipulator 120 which may function to modify the gated input signal in accordance with a second instruction contained in the stored binary word. The output of analog manipulator 120 is illustrated as transmitted by a data line to an analog to digital converter unit 122 where the modified analog input signal is converted to binary coded decimal form.

The binary coded decimal output of converter 122 representative of the scanned input variable is serially transmitted as illustrated functionally by the connecting data line through a gate 124 controlled by input program control circuit 118 to a data shift register 126 having a series input and a series output. The S or bit pulses are supplied to the shift circuit of register 126 through a gate 128 controlled by input program control circuit 118 to effect input shifting of the pulse combinations representative of the scanned analog input. In shift register 126 the input data is stored for serial transfer into a storage track of data storage memory section 32.

The data storage memory section 32 is shown as provided with two read-write heads 129 and 130 which serve two data storage tracks of the magnetic drum 10. A pair of read-write amplifiers 132 and 134 controlled by a read-write logic circuit 136 are associated with heads 129 and 130 respectively and serve to shape and amplify the pulse combinations to be read from or to be written into the associated storage tracks. As shown schematically by the connecting data lines, binary data is adapted to be transferred from shift register 126 to either amplifier 132 or amplifier 134 for amplification and insertion into a desired track of section 32 as selected by read-write logic circuit 136.

As previously mentioned, stored data is preferably made available to other system subsystems continuously or at periodic intervals. While the interval of availability depends upon the particular application of the system the read-write logic circuit 136 preferably functions to render the stored data available on alternate drum revolutions by transmitting appropriate read and write commands to the read-write amplifiers 132 and 134 as functionally illustrated by the connecting data lines. During a write operation data is transferred from register 126 through one of the amplifiers 132 and 134 to the associated storage track while during a read operation data is continuously read from the storage tracks by both amplifiers and transmitted by the associated output data lines into the subsystem data bus 34 which functionally illustrates the availability of the stored data to the other subsystems.

This basic read-write logic is accomplished through the provision of a flip-flop circuit 138 which receives R pulses from the Sync Section 12. During each drum revolution the R pulse generated by Sync Section 12 causes the flip-flop 138 to switch between its two output states and to thus establish one output state during alternate drum revolutions and a second output state during the other revolutions. One output state of flip-flop 138 is effective through logic circuit 136 to establish selective write operation of amplifiers 132 and 134 and the other output state is effective to establish read operation of the amplifiers to thus establish the desired logic whereby stored data is available on alternate drum revolutions.

Referring now back to the input scanning system which is operative in accordance with the input program stored in memory section 28, a typical circuit in block diagram is illustrated for achieving address selection during read operation of switch 108. More particularly, there is shown an address comparison circuit 140 which receives the system address signal SA from the Sync Section 12 and the output signal of an input program address counter 142 which is stepped or incremented by input program control 118. The output of counter 142 is representative of the address of a word in memory section 28 to be transferred into shift register 114. With the simple input scanning function of Subsystem 14 illustrated in FIG. 2a, the program words stored in each data track may be arranged to be sequentially read out in the order of storage. In this case input program control circuit 118 upon completion of the operations instructed by a word in shift register 114 is effective to step the counter 142 once to thereby cause the counter 142 output to be representative of the address of the next word in the storage track. Address Comparison Circuit 140 functions to compare the desired word address with the system address signal SA to establish a read instruction signal at coincidence which is effective through switch logic circuit 110 to effect read operation of the switch 108. The word stored at that address is then transferred from memory section 28 to input program shift register 114.

It will be obvious to those skilled in the art that logic circuit 110 may be provided with suitable circuitry operative in conjunction with other functional units to provide systematic selection of storage tracks within memory section 28 and that input program control 118 may be arranged to establish non-incremental actuation of counter 142 to read words from memory section 28 in non-sequential order.

Referring now to operation of Subsystem 14 assume for purposes of illustration that it is desired to scan five inputs a second or thus one input every 200 milliseconds and that one drum revolution requires 33 milliseconds. Thus, approximately 6 complete drum revolutions will occur during the scanning of one input in a time period of 200 milliseconds.

During this 200 millisecond time period read operation of amplifiers 132 and 134 will occur during 3 alternate revolutions and write operation will occur during the other 3 alternate revolutions in accordance with the logic established by flip-flop 138. Thus, every 66 milliseconds the read-write amplifiers 132 and 134 function to read the information stored in data storage section 32 to render it available to other system subsystems.

Since read-write switch 108 is utilized for program entry and display only during every 31st drum revolution consider this switch available for read operation under the control of logic circuit 110 during the entire 200 millisecond period being considered. The following table identified as Table A may be utilized to indicate the functions of switch 108 and amplifiers 132 and 134 during each of the six 33 millisecond time periods forming a 200 millisecond time period during which one input is scanned. The 6 successive time periods of approximately 33 milliseconds have been numbered 1 through 6 for purposes of identification.

Table A

| Time Period | Amp. 132 | Amp. 134 | Switch 108 |
|---|---|---|---|
| 1 (33 ms.) | Write | Write | Read. |
| 2 (33 ms.) | Read | Read | Read. |
| 3 (33 ms.) | Write | Write | Read. |
| 4 (33 ms.) | Read | Read | Read. |
| 5 (33 ms.) | Write | Write | Read. |
| 6 (33 ms.) | Read | Read | Read. |

It will be apparent that during periods 2, 4, and 6 read-write amplifiers 132 and 134 are continuously available to read information from the data storage memory section 32 independently of operation of the other components of the Subsystem 14. Thus, previously stored data is continuously available to Subsystems 16, 18, 22 and 24 during the scanning operation of Subsystem 14.

Utilizing the same six time periods as a time schedule a typical sequence of operation of the Subsystem 14 compatible with the availability of amplifiers 132 and 134 and switch 108 would take place as outlined in Table B.

Table B

Time period: Operation
1 (33 ms.) ---- Word transferred from memory section 28 into register 114.
2 (33 ms.) ---- Input gated to analog manipulator 120.
3 (33 ms.) ---- Analog to digital conversion of input in converter 122.
4 (33 ms.) ---- Output of converter 122 transferred to shift register 126.
5 (33 ms.) ---- Transfer of data in shift register 126 to memory section 32.
6 (33 ms.) ---- Counter 142 incremented by one.

As outlined on Table B, during the time period No. 1, read-write switch 108 will function in response to a read instruction from logic circuit 110 to transfer a word from a selected storage track of memory section 28 to shift register 114. During time period No. 2 the input selected by the transferred word is gated through switch matrix 118 into analog manipulator 120 where it is modified in accordance with instructions contained in the word. During time period No. 3 the modified analog signal is converted to binary decimal form in converter 122. During time period No. 4 the binary coded decimal output of converter 122 is transferred through gate 124 into shift register 126. During time period No. 5 in which, as indicated on chart A, read-write amplifiers 132 and 134 are operative to write information into their associated storage tracks, the binary word is transferred into one of the storage tracks determined by read-write logic unit 136. To complete the cycle, input program control 118 functions during time period No. 6 to increment counter 142 to manifest the next word address.

The function of the data storage memory section 32 is basically to store the most recent data concerning each of the system inputs, each piece of data being updated during each scanning cycle. During read operation of the read-write amplifiers 132 and 134 during alternate drum revolutions the most recent data is rendered available to all other subsystems. It will be apparent that if each storage track of memory section 28 contains 100 words corresponding to 100 inputs only 20 seconds will be required to scan 100 inputs. However, during the scanning operation all data stored in memory section 32 is available every 66 milliseconds to the other subsystems. With available data handling equipment the speed of operation of the Subsystem 14 can be greatly increased above that described. However, a scanning speed of five inputs per second has been found appropriate for many industrial process applications such as modern electric utility generating plants.

ALARM SUBSYSTEM 16—FIG. 2a

The Alarm Subsystem 16, averaging Subsystem 18 and Computer Subsystem 20 are each provided with a memory program or setpoint storage section on drum 10 and a storage section for data derived in the particular subsystem. With respect to each of these subsystems the mode of operation utilized in reading program instructions or data from the memory section, and in storing derived data is generally similar to that described for the Input Data Subsystem 14. Thus, for purposes of simplification, the time sequence of operation of the various components of Subsystems 16, 18 and 20 will not be described in detail it being within the capabilities of one skilled in the art to readily understand the logic and operations involved.

The Alarm Subsystem 16 memory section 38 is similarly provided with a read-write switch 150 associated with in this case four read-write heads 152, 154, 156 and 158 which are in turn associated with four data storage tracks of the memory section 38. In the arrangement shown, set point data for each of the system inputs is stored in memory section 38 in binary decimal form in the same manner as the data stored in memory sections 28 and 32 and in corresponding storage track locations. Depending on the application of the system, the memory section 38 may contain both a high and low set point for each of the system inputs or may contain a single average set point in binary decimal form.

In FIG. 2a, I have illustrated Subsystem 16 as operative to perform both high and low setpoint comparisons through the provision of a pair of data storage tracks in section 38 for each storage track of memory section 32, one of each pair containing a high setpoint and the other containing a low setpoint. Thus, Subsystem 16, as arranged in FIG. 2a functions to compare in sequence each piece of stored data in memory section 32 with both a high and low setpoint to produce both high and low alarm data, which may be stored in memory section 40 and as will subsequently be described, logged out in Subsystem 22 and/or visually displayed in Subsystem 26. It will be apparent, however, that suitable programming may be provided to achieve selected setpoint comparison and/or to produce a digital difference value in respect to an average setpoint.

Similar to read-write switch 108, switch 150 is also rendered operative to read data from the memory section 38 under the control of logic circuit 160 during 30 consecutive drum revolutions, and rendered operative for setpoint data entry or display under the control of the circuit of FIG. 3 during only the 31st drum revolution. This logic is established by the circuitry illustrated in FIG. 3 to permit entry of new setpoints when required by variations in the process conditions.

Operation of read-write switch 150 is controlled by a switch logic circuit 160. In response to a read command from logic circuit 160, a binary word comprising a combination of electrical pulses is read from a selected data storage track of memory section 38, amplified and shaped by a read amplifier 162, and received in a setpoint shift register 164 having a series input and series output. To effect the transfer of a word into shift register 164, S pulses are gated through a gate 166, also controlled by switch logic circuit 160. In this manner a binary word containing setpoint data is transferred from the appropriate memory location into the shift register 164 flip-flops.

Switch logic circuit 160 is functionally illustrated in FIG. 2a as being controlled by control circuit 168. The control circuit 168 functions to effect the described operation of logic circuit 160 in effecting the sequential transfer of words from memory section 38 to shift register 164, and also to control the gating of data from input data bus 34 for comparison with the high and low setpoint data in alarm comparison circuit 36. Control circuit 168 is functionally illustrated as controlling a gate 172 through which input data is transmitted from bus 34 into a data shift register 174. S shift pulses are supplied to shift register 174 by gate 176 controlled by control circuit 168.

Similar to the Subsystem 14, the Alarm Subsystem 16 is also provided with an alarm address counter 178 and an address comparison circuit 180 to establish a subsystem coincidence signal for switch logic circuit 160. Similar to Subsystem 14 control circuit 168 functions at the end of each setpoint comparison to increment counter 178 to establish a signal representative of the next word location.

Alarm comparison circuit 36 functions under the control of control 168 to compare the input data currently in data shift register 174 with the corresponding setpoint data in setpoint shift register 164 to establish a signal representative of the condition of a particular input. If the subsystem is utilized to merely manifest high or low alarm conditions, the output of comparison circuit 170 will have two possible states with respect to each setpoint comparison. Namely, normal or off normal.

The output of alarm comparison circuit 170 is shown as transmitted through a gate 182 controlled by control circuit 168 to a data shift register 184, which receives S shift pulses through a gate 186 also controlled by control circuit 168. From shift register 184 the alarm data is transmitted to one of a pair of read-write amplifiers 187, 188 associated with read-write heads 190, 192. Similar to the previously described subsystems, the amplifiers 187, 188 are controlled by a logic circuit 194 associated with a flip-flop 196 to establish read operation of the amplifiers during alternate drum revolutions and write operation during the other revolutions. To illustrate the continuous availability of the stored alarm data to the other subsystems the alarm data bus 42 is connected to read-write amplifiers 187, 188.

AVERAGING SUBSYSTEM 18—FIG. 2b

The averaging subsystem 18 illustrated in FIG. 2b functions to average successive values of selected inputs in accordance with a predetermined program stored in one or more storage tracks of memory section 44 and functions to store the average data in memory section 46.

Similar to the Input Data Subsystem 14 the Subsystem 18 includes a pair of read-write heads 200, 202 which are associated with two data storage tracks in memory section 44, a read-write switch 204 controlled by a switch logic circuit 206, a read amplifier 208 for amplifying and shaping the pulse data read from the memory section 44, an averaging program shift register 210 to which program instructions are transmitted from memory section 44, a gate 212 controlled by logic circuit 206 through which S pulses are transmitted to shift register 210 to effect input shifting thereof, an average program decoder 214, an average program control circuit 216, an address comparison circuit 218, and an average program address counter 220. Similar to Subsystem 14 these functionally represented components effect transfer in a predetermined sequence of program instruction words from desired storage tracks of memory section 44 into shift register 210. Each instruction word is decoded by decoder 214, and circuit 216 functions to effect the averaging operation instructed by the word. At the end of the averaging operation, control circuit 216 functions to increment counter 220 to initiate transfer of the next word from memory section 44 into shift register 210. As in the case of Subsystem 14, switch logic circuit 206 functions to effect read operation of switch 204 during 30 consecutive drum revolutions while the circuitry illustrated in FIG. 3 functions to establish read and write operation thereof during each 31st revolution to permit program entry during approximately 3% of the subsystem operating time.

Subsystem 18 is further functionally illustrated as including a gate circuit 222 controlled by control circuit 216 for selectively gating desired input data from input data bus 34 into a data shift register 224, which receives S shift pulses through a second gate 226 controlled by control circuit 216. Average computer 48 serves to collect and average successive values of selected input variables to establish an output representative of the average. The average is transmitted through a gate circuit 230, controlled by control circuit 216, into a data shift register 232 which receives S shift pulses through a gate 234 also controlled by control circuit 216. From shift register 232 average data is transmitted to a read-write amplifier 236 associated with a read-write head 238 for effecting entry of the average data into at least one storage track of memory section 46. The read-write amplifier 236 is also associated with a flip-flop 239 and a read-write logic circuit 240 to establish write operation of the read-write amplifier 236 during alternate drum revolutions and read operation thereof during the other revolutions. To illustrate the availability of the average data, I have shown average data bus 50 connected by a data line to read-write amplifier 236.

In operation of the Subsystem 18 assume that a word transferred from memory section 44 to shift register 210 contains an instruction to average the values of a particular input during ten consecutive scan cycles of Input Data Subsystem 14. In response the control circuit 216 will function to gate ten consecutive input values of the selected input from data bus 34 through gate 222 and shift register 224 into average computer 48 which may be provided with a memory circuit sufficient to store the ten consecutive readings. When ten values have been collected average computer 48 functions to divide the sum by ten to produce an average which is entered into storage in memory section 46 from where it is available to the other subsystems as functionally illustrated by data bus 50. At the end of the averaging operation the average program control circuit 216 will function to increment counter 220 to effect transfer of the next instruction word from memory section 44 into shift register 210. In this manner the Subsystem 18 will function to continuously average values of selected inputs in accordance with instructions stored in memory section 44.

COMPUTER SUBSYSTEM 20—FIG. 2b

This subsystem provides a means for performing exacting complex calculations completely independent of the input scanning and other subsystem functions, thereby eliminating the need for complex programming circuitry in the computer itself. The computer subsystem is used only to compute data, and is not operational in the sense that it must be concerned with the real time requirements of the other system functions.

Computer program memory section 54 is provided with a pair of read-write heads 241, 242 which cooperate with a read-write switch 244 controlled by a switch logic circuit 246. Similar to the other subsystems, the Subsystem 20 includes a read amplifier 248, a computer program shift register 250, which receives S shift pulses through a gate 252 controlled by switch ogic circuit 246, an address comparison circuit 254, an address counter 256, and a computer program transfer control circuit 260. Similar to the previously described subsystem this circuitry enables computer program instructions to be transferred out of memory section 54 into shift register 250 for subsequent entry into the computer 52 memory. A manual control circuit 261 is provided for manually initiating a transfer of program instructions.

The Subsystem 20 contemplates the use of a general purpose digital computer 52. One suitable computer, for example, is the commercially available Packard Bell 250 computer.

To permit the computer 52 to operate upon its own time cycle, program information is preferably transferred from shift register 250 through a gate circuit 262, controlled by control circuit 260 into a buffer shift register 264 from which the program information is transferred into the computer under the control of the computer, which generates shift pulses as indicated for shift register 264.

A computer data input control circuit 266 functions to control the gating of data from buses 34, 42, and 50 through a gate circuit 268 into a data shift register 270 in accordance with instructions generated by computer 52 as indicated by the interconnecting data lines. The shift register 270 is supplied with S shift pulses through a gate 272 controlled by control circuit 266. Data is transmitted from shift register 270 through a gate 274 to a buffer shift register 276 from which the data is transferred to the computer 52 in response to shift pulses generated within the computer.

Data computed by the computer 52 is received in a buffer shift register 280 which also receives shift pulses generated within the computer. The computed data is transmitted from shift register 280 through a gate controlled by control circuit 266 to computed data shift register 284 which receives S shift pulses through a gate 286 also controlled by data input control circuit 266. From shift register 284 the computed data is transmitted to a read-write amplifier 288 associated with a read-write head 290 of memory section 56. Amplifier 288 may also be controlled by a flip-flop 294 and a logic circuit 296 similar to the other subsystem data storage sections to effect read operation of switch 288 during alternate drum revolutions and write operation during the other revolutions. Thus, during alternate drum revolutions stored computed data is readily available to the other subsystems as illustrated functionally by the data line connecting amplifier 288 with computed data bus 58.

In operation of Subsystem 20 memory section 54 comprises a slow permanent memory, which has a basic computational program stored therein. In accordance with instructions established by computer program transfer control 260 program information is transferred from the memory section 54 to the higher speed smaller memory of the computer 52 whereupon the computer functions in accordance with its own time schedule to perform the instructed computations. The memory section 54 may also contain auxiliary programs which can be utilized during different operating conditions of the process.

LOG SUBSYSTEM 22—FIG. 2c

The Subsystem 22 functions to log out selected data by means of printer 60 in accordance with a program stored in memory section 62. Memory section 62 has associated therewith a pair of read-write heads 297, 298 and a read-write switch 299 controlled by a switch logic circuit 300. The Subsystem 22 further concludes, similar to the other subsystems, a read amplifier 302, a log program shift register 304 which receives S shift pulses through a gate 306 controlled by switch logic circuit 300, a log program decoder 308, a log program control circuit 310, an address comparison circuit 312, and an address counter 314. Similar to Subsystem 14, program instructions are transferred from the memory section 62 into shift register 304 whereupon log program control 310 functions to carry out the log program instruction and then increment counter 314 to effect read out of the next instruction. Approximately 3% of the operating time is also devoted to program entry and display similar to the other subsystems, as will be described more specifically in connection with FIG. 3.

Log program control circuit 310 functions in response to instructions contained in memory section 62 to control the gating of selected data from data buses 34, 42, 50, and 58, through a gate circuit 316 into a shift register 318, which receives S shift pulses through a gate circuit 320 controlled by control circuit 310. A printer control circuit 322 controlled by log program control circuit 310 functions to actuate printer 64 to log out the data in shift register 318.

Subsystem 22 may be arranged to sequentially log out selected data arrived in other subsystems according to the program stored in memory section 62, and to continuously repeat the log cycle. Preferably, however, the Subsystem 22 is arranged to continuously operate on a time schedule with only a periodic logging out of desired data. To this end I have shown in FIG. 2c a clock 324, and logic circuit 326, associated with log program control 310 and printer control 322, to automatically effect commencement of a log cycle at predetermined intervals of time such as for example every 30 minutes. In the event it is desired to log out the data before expiration of a time period, there is provided a suitable manual start circuit 330, which enables a log cycle to be commenced through manual actuation of a switch.

CONTROL SUBSYSTEM 24—FIG. 2c

Subsystem 24 functions to utilize data derived in other subsystems to adjust or modify a process control system 322, or to establish the primary control indices for the control system. Subsystem 24 also includes a pair of read-write heads 334, 336 associated with a read-write switch 338, a switch logic circuit 340, a read amplifier 342, a control program shift register 344, which receives S shift pulses through a gate circuit 346 controlled by logic circuit 340, a control program decoder 348, a control circuit 350, an address comparison circuit 352 and an address counter 354.

Similar to the other subsystems, this circuitry enables control program instructions to be transferred out of memory section 66 into shift register 344, the control circuit 350 being operative to initiate the control actions contained in the instruction through the agency of a control logic circuit 356. The control circuit 350 functions in response to control instructions requiring data from other subsystems to control the gating of selected data from buses 34, 42, 50 and 58, through a gate 358 into a data shift register 360, which receives S shift pulses through a gate 362 controlled by control circuit 350. Control logic circuit 356 utilizes the data in shift register 360 to modify the operation of the process control system 332 according to the program instruction in shift register 344.

The arrangement of Subsystem 24 coupled with the continuous availability of the data from other subsystems establishes complete independence of the control function from the other subsystem functions eliminating the need for time sharing the equipment to insure adequate control.

DISPLAY SUBSYSTEM 26—FIG. 2d

Subsystem 26 is provided to effect visual display to an operator or observer of data in any of the data storage memory sections 32, 40, 46, 56 without interfering with the other subsystem functions. The subsystem 26 includes a digital display unit 364 having numerical indicators positioned by a suitable display drive 366. A plurality of gating circuits controlled by a control circuit 368 and represented by a single functional block 370 are associated with data buses 34, 42, 50 and 58 for gating selected data from the data buses during read operation of the read-write amplifiers associated with the various data storage memory sections. A selected piece of data in binary decimal form is gated from one of the data buses into a shift register 372 which receives S shift pulses through a gate 374 controlled by display control circuit 368. The binary word thus transferred into shift register 372 is decoded by decoder 376 and utilized to position display drive 366 to effect a visual display of the data by display unit 364.

The subsystem 26 also includes a manual address selector 378 which can be operated manually to establish a word address signal input to an address comparison circuit 380. Address comparison circuit 380 functions to compare the manual address signal derived in selector 378 with the system address signal SA to establish a coincidence signal which initiates operation of control circuit 368 to read the selected word from its storage track during alternate drum revolutions when stored data is available through operation of the logic circuits previously described.

Subsystem 26 makes use of the feature of continuous data availability to provide a practically instantaneous display of selected data upon a request therefor. Similar to the other subsystems the display function may be utilized continuously if desired without interfering with the other subsystem functions.

PROGRAM ENTRY—FIG. 3

In FIG. 3 I have illustrated by functional components in block diagram a circuit for establishing read and write operation of read-write switches 108, 150, 204, 244, 298, and 338. As previously stated, this circuit uniquely establishes a read operating condition of the read-write switches 108, 150, 204, 244, 298 and 398 during 30 consecutive drum revolutions under the control of logic circuits 110, 160, 206, 246, 300 and 340 and read and write operation during the 31st revolution under control of the circuit of FIG. 3 to render the switches available for program entry or display during approximately 3% of the operating time.

The subsystem illustrated in FIG. 3 comprises an address selector circuit 380 for establishing a signal representative of the location at which program information is to be entered into or read from the memory. An address comparison circuit 382 functions to compare this signal with the system address signal SA to establish a coincidence signal. An input program control circuit 384 functions in response to the coincidence signal and also in response to a signal derived in a circuit 386 during each 31st drum revolution to effect write or read operation of one of the switches 108, 150, 204, 244, 298 and 338 through a switch logic circuit 388, which selects the particular read-write switch and read-write head according to the memory location selected by the operator.

Input program words are entered into the system by means of a suitable device 390 controlled by an input-output control circuit 384. The input program words are received in a shift register 392 which receives S shift pulses through a gate circuit 394 controlled by circuit 384. From shift register 392 the program words are transmitted through a gate 396 and write amplifier 398 to the read-write switches 108, 150, 204, 244, 298 and 338.

Referring to circuit 386, which establishes a signal during each 31st drum revolution to initiate operation of input control circuit 384, there is shown a normally open gate 400 which receives R pulses from the sync Section 12. The R pulses are normally conducted through gate 400 to a counter comprising a pair of counters 402 and 404. The counter 402 counts the R pulses to the base 10, and establishes an output signal to an And circuit 406 and a carry input signal to counter 404 upon the occurrence of each ten R pulses. Counter 404 becomes operative upon the occurrence of the thirtieth R pulse to establish a second input to And circuit 406 causing the same to establish an output signal representative of the existence of both inputs. A memory circuit 408 responsive to the output of And circuit 406 functions to close gate circuit 400 and to establish conduction of the next or thirty-first R pulse through a gate 410 to the input control circuit 384.

The circuit 386 thus functions to count thirty consecutive R pulses and then to open gate 410 to transmit the thirty-first R pulse to control circuit 384 to initiate operation thereof. Following application of the thirty-first R pulse to control circuit 384 the circuit 386 functions to repeat the counting cycle.

To modify or change the program the operator inserts program data by means of device 390 and selects the memory address by means of address selector 380. During the 31st drum revolution input program control 384 is rendered operative by the R pulse conducted by gate circuit 410 and upon occurrence of a coincidence signal from address comparison circuit 382 effects transfer of data in shift register 392 into the proper storage track of drum 10 selected by switch logic circuit 388.

In addition to providing a means for program entry, the circuit of FIG. 3 also includes means for displaying to an operator, the program data in each of the program memory sections. Similar to program entry operation the operator selects the memory address by means of address selector 380, and switch logic circuit 388 functions in response to the display instruction to establish read operation of the switches 108, 150, 204, 244, 298 and 338. A selected program word is read from its data track and into a read amplifier 412 and through a gate 414 controlled by input-output control circuit 384 into shift register 392. A decoder 416 functions to decode the program word stored in shift register 392 to establish a control signal for display drive 418 which functions to position the numerical indicators of a digital display unit 420.

SUMMARY

It will be apparent that the disclosed data handling and computing system provides complete independence of the various specific system functions eleminating the time sharing of equipment and the need for complex programming. Input Data Subsystem 14 functions continuously to scan a plurality of inputs in accordance with a program stored in memory section 28 and to store the scanned input data in memory section 32 from where it is continuously available to the other subsystems through alternate read-write operation of read-write amplifiers 132 and 134.

Alarm Subsystem 16, Averaging Subsystem 18 and Computer Subsystem 20 function in a similar manner utilizing the continuously available data in memory section 32 and/or memory sections 40, 46, and 56 to perform their separate subsystem functions in accordance with the programs stored in memory sections 38, 44, 54.

Similar to the Subsystem 14 the data derived in Subsystems 16, 18 and 20 is stored in data storage sections 40, 46 and 56 from where it is continuously available to the other subsystems through alternate read and write operation of the associated read-write amplifiers.

The continuous availability of the data stored in memory sections 32, 40, 46 and 56 can be emphasized by consideration of the rotational speed of the drum 10. Assuming that one drum revolution occurs in thirty-three milliseconds as described in connecton with Subsystem 14 then any of the parallel subsystems can obtain a word from one of the data storage sections within sixty-six milliseconds. The stored data is available to one or all subsystems at the same time, and the continuous availability may be analogized with a dial telephone system where anyone can dial a special number and listen in on a broadcast or announcement of the current weather.

It will be apparent that data stored in the various subsystem memory sections may be utilized by the other subsystems in any desired manner depending on the stored programs. For example Alarm Subsystem 16 may be programmed to make setpoint comparisons of the computed data stored in section 56 and average data stored in section 46. Averaging Subsystem 18 may be programmed to average computed data stored in section 56. Such additional data handling functions may be readily incorporated by modifying the program in the subsystem involved to gate the needed data from the appropriate data buses. Thus, the parallel subsystem arrangement coupled with the continuous availability of stored data renders the system extremely flexible and capable of being easily modified by process engineers to incorporate additional functions.

The Log Subsystem 22 and Display Subsystem 26 have particular utility in the parallel data handling system disclosed in that any piece of stored data may be practically instantaneously logged out or visually displaced upon an instruction from an operator without interfering with the various subsystem functions.

One of the most important features of the invention is the inclusion of digital computer 52 within the independently operative Subsystem 20 where it is only used to compute data and is not operational in the sense that it must be concerned with the real time requirements of the process. This parallel subsystem location of the computer 52 eliminates the complex computer program generally encountered in a system utilizing the general purpose computer approach described in the introductory remarks. With the parallel system described the computer is relieved of directing the functions of data collection, alarm, averaging, logging, display and control, and need only be provided with a simple computational program from which it operates on its own time schedule completely independent of the other subsystems.

The programing simplicity achieved through use of a plurality of independently operating parallel subsystems renders the data handling system particularly valuable to a process industry such as an electric utility company. Each subsystem operates from its own independent program which may be easily modified by a power engineer without the assistance of a computer expert. The program in any of the subsystems may be changed without interference with the other subsystem programs, or any one subsystem may be removed from service completely either intentionally or because of equipment failure without interference or inter-action with the other subsystems.

The provision of independent subsystems also renders the system more adaptable to actual control of a process. The Control Subsystem 24 is continuously operative or availabel to modify control of the process. With the general purpose computer approach discussed in the introductory remarks the system operating time must be divided among several system functions resulting in only periodic availability of the system for control purposes.

While one embodiment of the invention has been herein shown and described, it will be apparent to those skilled in the art that many changes may be made in the arrangement and construction of parts without departing from the scope of the invention as defined in the appended claims.

What I claim as new, and desire to secure by Letters Patent of the United States, is:

1. In a data handling system for performing a plurality of specific system functions, the combination comprising, a memory having a plurality of separate sections containing operational programs for each of the specific system functions respectively, and a plurality of functionally independent data handling subsystems associated with said memory sections respectively for performing the specific system functions in accordance with said operational programs.

2. In a data handling system for performing a plurality of system functions, the combination comprising, a memory having a plurality of memory sections, a plurality of functionally independent subsystems for performing said system functions respectively, each of said subsystems having a program storage section in said memory containing an operational program for the subsystem and a data storage memory section for storing data derived in the subsystem, means associated with each of said subsystems for entering the data derived therein into storage in its data storage memory section and for periodically reading stored data from the data storage section to render the data available to the other of said subsystems.

3. In a data system for performing a plurality of system functions, the combination comprising, a rotatable magnetic drum memory having a plurality of memory sections, an input data scanning subsystem utilizing one of said memory sections to store an input scanning program and another of said memory sections to store the input data, means associated with said scanning subsystem operative in accordance with said input scanning program to scan a plurality of data inputs, means operative during preselected drum revolutions to store the scanned data in said input data storage section and to continuously update the stored input data during each scanning cycle, said means being operative during other preselected drum revolutions to read the stored input data, a plurality of other independently operative subsystems each utilizing one of said memory sections to store an operational program for the subsystem, and means associated with each of said other subsystems for gating desired input data from said input data storage section during read operation of said data reading means in accordance with the operational program of each of said other subsystems.

4. In a data system for performing a plurality of system functions, the combination comprising, a rotatable magnetic drum, an input data scanning subsystem operative in accordance with a scanning program stored on the drum to scan in a predetermined sequence a plurality of data inputs and to store the values of the inputs on the drum, a functionally independent alarm subsystem operative to compare values of selected inputs with setpoint data stored on the drum and to store alarm data on the drum, a functionally independent computer subsystem operative to make selected computations utilizing selected data inputs in accordance with a computational program stored on said drum and to store the computational results on said drum, a logging subsystem operative to periodically log out selected input data, alarm data and computational results in accordance with a program stored on said drum, means associated with each of said subsystems to write data derived in said subsystems on the drum and operative at periodic intervals to read stored data from the drum to render it available in parallel to the other subsystems, and means associated with each of said subsystems for gating selected data required by the associated subsystem from storage to the subsystem during read operation of the last said means.

5. In a data system as claimed in claim 4 further including, a display subsystem operative to effect a visual display of data derived in said input data subsystem, said alarm subsystem and said computer subsystem, manual means associated with said display subsystem for initiating operation thereof to display selected data, and gating means associated with said display subsystem for gating the selected data thereto during read operation of said data reading means.

6. In a data system as claimed in claim 5 further including an averaging subsystem operative to average consecutive values of said data inputs in accordance with an averaging program stored on said drum, and gating means associated with said averaging subsystem for gating selected data thereto from said input data subsystem during read operation of said storage data reading means.

7. In a data system as claimed in claim 6 further including a control subsystem for logically modifying a process control system in accordance with a program stored on said drum, and gating means effective to gate selected data thereto during read operation of said storage data reading means.

8. In a data handling and computing system, the combination comprising, a permanent memory, a plurality of functionally independent subsystems each operative in accordance with programs stored in said memory for deriving data in accordance with said programs respectively, means in each of said subsystems for storing the data derived in the subsystems in said memory and for reading stored data from said memory to render the stored data continuously available, a digital computer associated with one of said subsystems for making computations in accordance with the subsystem program stored in said memory, and means for gating selected data from said memory to said computer during read operation of the first said means.

9. In a data handling and computing system as claimed in claim 8 further including a control subsystem operative independently of said computer subsystem for controlling a process, and means associated with said control subsystem for gating selected data from said memory to said control subsystem during read operation of the first said means.

10. In a data handling and computing system, the combination comprising, a permanent memory, a plurality of functionally independent subsystems each operative in accordance with a program stored in said memory for deriving data in accordance with said programs respectively, means in each of said subsystems for storing data derived in each subsystem in said memory and for reading the stored data from said memory, a computer subsystem having a computational program stored in said memory, a digital computer for making calculations in accordance with said computational program, means for transferring program instructions from said memory to said computer, means for gating selected data required by said computational program from said memory to said computer during read operation of the first said means, and means for storing the computed data in said memory.

11. A data handling and computing system as claimed in claim 10 further including a functionally independent control subsystem, a control program for said control subsystem stored in said memory, means for utilizing data derived in the other of said subsystems for controlling or modifying a process, means for gating selected data required by said control program to said process control means from said memory during read operation of said stored data reading means.

References Cited by the Examiner

UNITED STATES PATENTS

| 2,540,654 | 2/1951  | Cohen    | 340—172.5 |
| 2,922,990 | 1/1960  | Anderson | 340—174   |
| 3,061,192 | 10/1962 | Terzian  | 235—157   |
| 3,063,036 | 11/1962 | Reach    | 340—172.5 |

ROBERT C. BAILEY, *Primary Examiner.*

R. ZACHE, *Assistant Examiner.*